United States Patent [19]

Blauhut

[11] Patent Number: 4,608,855
[45] Date of Patent: Sep. 2, 1986

[54] CIRCUIT FOR THE RECOGNITION OF KNOCKING OF AN OTTO ENGINE

[75] Inventor: Reinhold Blauhut, Werdohl, Fed. Rep. of Germany

[73] Assignee: Atlas Fahrzeugtechnik GmbH, Fed. Rep. of Germany

[21] Appl. No.: 635,174

[22] Filed: Jul. 27, 1984

[30] Foreign Application Priority Data

Aug. 2, 1983 [DE] Fed. Rep. of Germany ....... 3327766

[51] Int. Cl.$^4$ ............................................. G01L 23/22
[52] U.S. Cl. ..................................................... 73/35
[58] Field of Search .................... 73/35, 115; 123/425, 123/435

[56] References Cited

U.S. PATENT DOCUMENTS

| | | | |
|---|---|---|---|
| 3,286,164 | 9/1966 | de Huff | 324/16 |
| 4,233,943 | 11/1980 | Rogora et al. | 73/35 |
| 4,491,110 | 1/1985 | Bone et al. | 73/35 |

FOREIGN PATENT DOCUMENTS

| | | |
|---|---|---|
| 2443413 | 3/1976 | Fed. Rep. of Germany . |
| 3006665 | 9/1981 | Fed. Rep. of Germany . |
| 2433105 | 3/1980 | France . |

Primary Examiner—Stewart J. Levy
Assistant Examiner—John E. Chapman, Jr.
Attorney, Agent, or Firm—Bacon & Thomas

[57] ABSTRACT

A circuit for the recognition of knocking of an Otto engine includes a spark plug in the combustion chamber of a cylinder which also serves as an ionic current probe. Both an excitation voltage generator and, an evaluation circuit for the measuring voltage are coupled to the high-voltage ignition circuit. The excitation voltage generator is provided by a high-frequency oscillator. The input coupling of the excitation voltage is effected non-galvanically. The evaluating circuit comprises an amplitude demodulator for the high-frequency oscillations. The benefits of the present invention resulting from a knock recognition circuit of such a configuration that critical electrical components and galvanic coupling are avoided.

10 Claims, 2 Drawing Figures

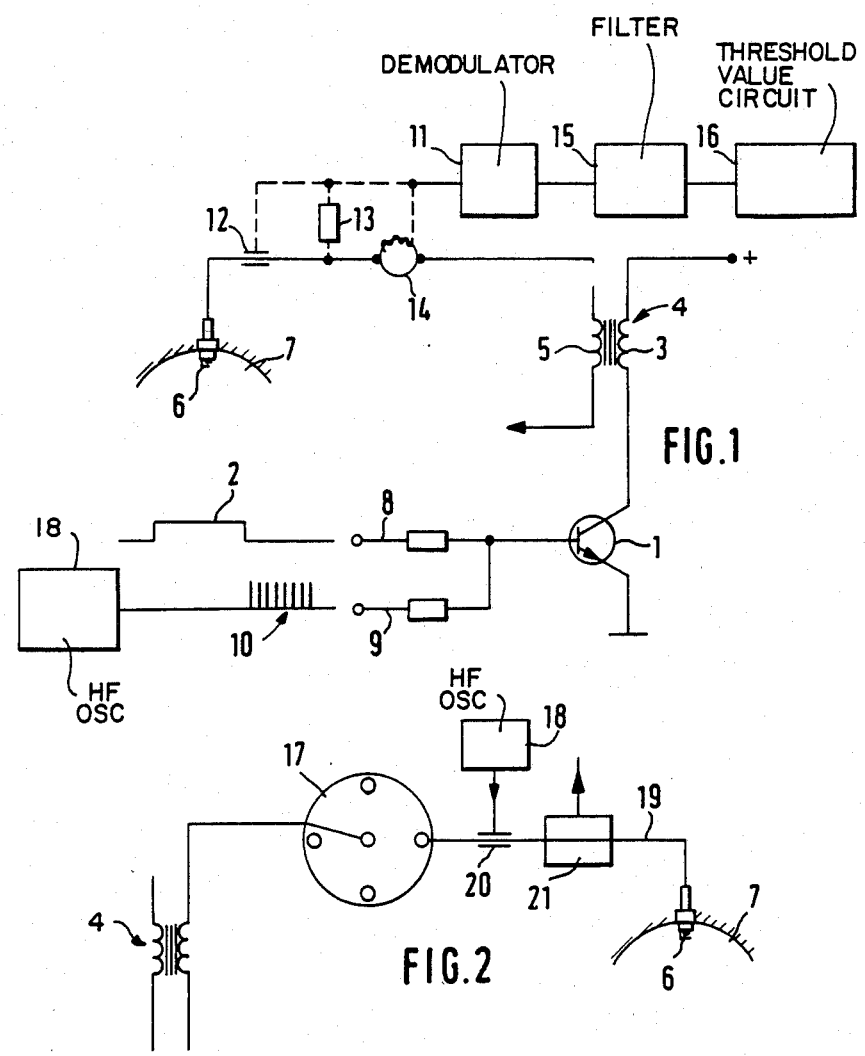

CIRCUIT FOR THE RECOGNITION OF KNOCKING OF AN OTTO ENGINE

BACKGROUND OF THE INVENTION

1. Field of the Invention

The invention relates to a circuit for the recognition of knocking of an Otto engine whrein a spark plug in the combustion chamber of a cylinder also serves as an ionic current probe. Both an excitation voltage generator and an evaluation circuit for the measuring voltage are coupled into the spark plugs high voltage ignition circuit.

Engine knocking occurs if during the combustion uncontrolled conditions of combustion occur. This knocking is detrimental to the engine and can lead to destruction of the engine. Therefore, it is important to recognize engine knocking properly and exactly.

2. Description of the Prior Art

Prior art circuits of this nature work with an direct-voltage excitation. The coupling of this direct-voltage excitation into the high-voltage circuit is carried out via a high-ohmic resistor or a high-voltage diode. These are critical constructional elements, and in case of failure of one of these, the whole ignition circuit is short-circuited so that the Otto engine ceases to operate.

It has been proposed in DE-OS 30 06 665 to obtain the direct-voltage excitation for the ionic current from the ignition current. However, in this case the excitation voltage is available just for a very short period within the operational period. This is insufficient for the detecting of a knocking condition.

SUMMARY OF THE INVENTION

The object of the present invention is to provide an improved circuit for the recognition of knocking configured such that critical electrical components and a galvanic coupling (i.e., D.C. voltage coupling) can be avoided.

According to the present invention, this object is achieved by the following:

(a) the excitation voltage generator is a high-frequency oscillator;

(b) the coupling of the excitation voltage is effected non-galvanically; and (c) the evaluation circuit contains an amplitude demodulator for the high-frequency oscillation.

The invention differs form the prior art in that by utilization of a high-frequency voltage as the excitation voltage, a non-galvanic input coupling of the excitation voltage and output coupling of the measuring voltage is possible.

As a further object of the present invention, it is provided that the high-frequency oscillator is tuned to a frequency between 15 and 100 kHz.

As a further object of the invention, it is provided that the amplitude demodulator may be a synchronous demodulator having a product detector.

As a further object of the invention, it is provided that within the evaluation circuit, a filter having a pass-band of 8 to 10 kHz is connected to the amplitude demodulator.

As a further object of the invention, it is provided that the output of the filter is connected to a threshold value circuit.

As a further object of the invention, it is provided that in case of a distributorless ignition circuit the input coupling of the high-frequency oscillation is carried out in the form of pulses via an ignition transistor.

As a further object of the invention, it is provided that in case of an ignition with distributor the input coupling of the high-frequency oscillation is achieved via capacitive coupling into the spark line.

As a further object of the invention, it is provided that the output coupling of the measuring voltage is carried out by capacitive coupling.

As a further object of the invention it is provided that the coupling of the measuring voltage is carried out via a high-ohmic resistor.

As a further object of the invention it is provided that the coupling of the measuring voltage is carried out via a current transformer.

BRIEF DESCRIPTION OF THE DRAWINGS

Embodiments of the invention will be described in the following with reference to the accompanying drawing, wherein FIG. 1 is a schematic view of a distributorless ignition; showing the knock recognition circuit according to the present invention and FIG. 2 is a corresponding schematic view of an ignition with distributor.

DESCRIPTION OF THE PREFERRED EMBODIMENT

FIG. 1 shows an ignition transistor 1, the base of which is excited by an ignition pulse 2. The ignition transistor 1 switches the current through a primary winding 3 of an ignition transformer 4. A spark plug 6 of a combustion chamber 7, or a cylinder of an Otto engine, is connected to a secondary winding 5 of the ignition transformer 4. For simplicity of description further switching elements of the ignition circuit, particularly the rectifier elements for the switching on of possible additional cylinders, are not shown here.

High-frequency pulses 10 arising from a high-frequency oscillator 18 (shown in FIG. 2) and produced following the ignition pulse 2 are applied via an input line 9 to the base of the ignition transistor 1 in parallel with an input line 8 for the ignition pulses 2. The high-frequency pulses 10 excite the ignition transformer 4 for a short period so that a high-frequency voltage occurs in the secondary winding 5. The high-frequency pulses 10, and thus the high-frequency voltage in the secondary have a frequency between 15 and 100 kHz. The corresponding high-frequency alternating current is superimposed upon the ignition current and flows via the spark gap of the spark plug 6. Variations in the combustion process or interruptions of the combustion process, known as knocking, lead to fluctuations of the pressure field and of the ion field and, thus, to an amplitude modulation of the high-frequency voltage. This amplitude modulation is detected in a demodulator 11.

The output coupling of the high-frequency measuring voltage may be carried out optionally by means of a capacitor 12, via a high-ohmic resistor 13, or via a current transformer 14. This is indicated by the dashed line connections. The demodulator 11 is an amplitude demodulator. In the demodulation voltage inter alia the knocking frequencies between 8 and 10 kHz are present. These knocking frequencies are filtered by a filter 15 with a pass-band between 8 and 10 kHz. A threshold value circuit 16 is coupled to the filter 15. The threshold value circuit 16 is actuated if sufficient energy passes within the pass-band of the filter 15. The output signal of the threshold value circuit 16 respresent detection of knocking conditions and enables an adjustment of the time of ignition nearer to the upper dead point, until the knocking condition ceases.

The demodulator 11 may be provided appropriately as a synchronous demodulator having a product detector. As is known, a synchronous demodulator provides high amplification of the measuring voltage with subsequent limitation as well as a product formation between this limited voltage and the original signal. Thereby the carrier frequency is suppressed so that just the modulation frequencies remain.

FIG. 2 shows the use of the present invention for an ignition with a distributor 17. Due to the fact that the distributor 17 comprises a sparking gap, it is necessary to couple the high-frequency voltage of a high-frequency oscillator 18 into the ignition line 19. A coupling capacitor 20 for capacitive coupling is shown herein. The output coupling is effected via a decoupling circuit 21, which may be provided in the various manners as described above. The evaluation circuit arranged thereafter is, for simplicity, not shown in FIG. 2. In the case of an ignition with a distributor, knocking monitoring supervision of one combustion chamber or cylinder is normally sufficient. However, it is, of course, also possible to monitor all of the cylinders. Then it will be necessary to couple the high-frequency oscillation of the high-frequency oscillator 18 into all the ignition lines for the other combustion chambers.

I claim the followng:

1. A circuit for the recognition of knocking of an engine having a high-voltage ignition circuit and having a spark plug in the combustion chanber of a cylinder which also serves as an ionic current probe, said knock recognition circuit comprising:

(a) an excitation voltage generator comprising a high frequency osicllator non-galvanically coupled to the spark plug for producing high frequency voltage oscillation; and
(b) an evaluation circuit for measuring voltage coupled into said high-voltage ignition circuit, wherein said evaluation circuit includes an amplitude demodulator for the high-frequency voltage oscillation.

2. A circuit according to claim 1 wherein said high-frequency oscillator operates at a frequency between 15 and 100 kHz.

3. A circuit according to claim 2 wherein said amplitude demodulator is a synchronous demodulator having a product detector.

4. A circuit according to claim 3 wherein said evaluation circuit further comprises a filter having a pass-band of 8 to 10 kHz which is connected to the amplitude demodulator.

5. A circuit according to claim 4 wherein the output of said filter is connected to a threshold value circuit.

6. A circuit according to claim 1 for use in a distributorless ignition circuit wherein the high-frequency osicllator generates high frequency pulses supplied to an ignition transistor.

7. A circuit according to claim 1 for use in an ignition circuit with a distributor wherein the coupling of the high-frequency oscillator comprises a capacitor.

8. A circuit according to claim 6 wherein the coupling of the evaluation circuit comprises a capacitor.

9. A circuit according to claim 1 wherein the coupling of the evaluation circuit comprises a high-ohmic resistor.

10. A circuit according to claim 6 wherein the coupling of the evaluation circuit comprises a current transformer.

* * * * *